United States Patent [19]

Lazar

[11] Patent Number: 5,185,111
[45] Date of Patent: Feb. 9, 1993

[54] METHOD OF PRODUCING ELASTOMERIC OPEN CELL STRUCTURES

[75] Inventor: Warren G. Lazar, Tucson, Ariz.

[73] Assignee: Polypore, Inc., Tucson, Ariz.

[21] Appl. No.: 654,935

[22] Filed: Feb. 13, 1991

[51] Int. Cl.⁵ .................................... B29C 67/20
[52] U.S. Cl. ....................... 264/49; 264/41; 264/344
[58] Field of Search ................... 264/49, 41, 344

[56] References Cited

U.S. PATENT DOCUMENTS

| | | | |
|---|---|---|---|
| 3,253,542 | 5/1966 | McDonough | 101/367 |
| 3,536,796 | 10/1970 | Rock | 264/49 |
| 3,640,829 | 2/1972 | Elton | 161/159 |
| 3,718,532 | 2/1973 | Hayes, Jr. | 161/159 |
| 3,770,537 | 11/1973 | Elton | 156/77 |
| 3,855,133 | 12/1974 | Roehsler | 264/49 |
| 3,860,680 | 1/1975 | Warwicker et al. | 264/41 |
| 3,882,054 | 5/1975 | Hostettler | 264/49 |
| 3,928,521 | 12/1975 | Haren et al. | 264/49 |
| 3,971,315 | 7/1976 | Hansen | 101/333 |
| 3,998,994 | 12/1976 | Decroix et al. | 264/345 |
| 4,041,115 | 8/1977 | Jenkins et al. | 264/49 |
| 4,157,424 | 6/1979 | Boutle | 521/61 |
| 4,175,177 | 11/1979 | Potts | 264/22 |
| 4,190,707 | 2/1980 | Doi et al. | 264/49 |
| 4,226,886 | 10/1980 | Lakes | 428/304 |
| 4,315,877 | 2/1982 | Coplan et al. | 264/45.9 |

Primary Examiner—Allan R. Kuhns
Attorney, Agent, or Firm—Joel D. Skinner

[57] ABSTRACT

A method of producing cellular, reticulated structures of elastomeric materials having interconnected networks of cavities which are useable in retaining and self-metering liquids. The method of producing such microporous polymeric structure includes forming a homogeneous mixture including at least one polymeric resin, combined with void former and a polyfunctional compound. The ratio by weight between the polymeric material and the polyfunctional compound is preferably from 18:1 to 1:3. The void former, polymeric material and polyfunctional compound are preferably admixed at approximately room temperature and then shaped at low temperature. The mixture is then cooled and the void former is extracted with a suitable solvent.

15 Claims, 4 Drawing Sheets

METHOD OF PRODUCING ELASTOMERIC OPEN CELL STRUCTURES

BACKGROUND OF THE INVENTION

This invention relates to microporous elastomeric compositions and methods of making such compositions. More particularly, the invention relates to a method of making reticulated microporous elastomeric structures having interconnected networks of cavities. The material produced by the method has the property of high liquid retention and is further capable of self-metering liquids upon the application of pressure.

Microporous elastomeric materials having interconnected cellular networks are used for various purposes including retentive liquid dispensing rollers, pads and the like which are used, for example, in the printing industries. These liquid filled microporous materials have also been utilized for other applications, such as lubrication. The material may also be used without liquids for various applications, such as filtration and shock absorption. It is well known that microporous materials may be made by using polymeric starting materials and employing void formers to provide porosity therein. The resulting material may then be processed into specific shapes. However, such materials and methods of production have proven to be complex and uneconomical, as well as being limited as to function and application.

In the past, there have been attempts to produce porous profiles which function well for the user and further meet manufacturer's criteria of economy, ease of manufacture, and broad spectrum composition and application. For instance, U.S. Pat. No. 3,253,542 (McDonough) discloses an improved inked roller. However, the process requires a compatible plasticizer for the polymer to form a plastisol. And, the plastisol must be condonable with the filler liquid which limits applicability. The forming process is also time consuming.

U.S. Pat. No. 4,226,886 (Lakes) discloses a microporous structure with an improved reservoir system. However, the materials must be heated to a molten state, and the process includes a mixing step which is time consuming and further limits the choice of components. The material provided thereby also exhibits a skin on its outermost surface which reduces performance.

Despite the need for a microporous elastomeric material for retaining and self-metering liquid, and a method of preparing such material which is economical and simple to practice, and which overcomes the limitations of the prior art, none insofar as is known has been proposed or developed.

Accordingly, it is an object of the present invention to provide a composition for use in elastomeric microporous structures, and a method of making such structures, which have good liquid retention and metering properties, which can be produced from a wide variety of materials, and which can be used with a wide variety of liquid systems.

It is a particular object of the invention to provide a composition and method of making elastomeric microporous structures which do not require plasticizers or high temperature processing. Furthermore, it is an object of this invention to provide elastomeric microporous structures, and a method of producing such structures, suitable to reservoir and meter liquids, by employing polyfunctional compounds.

Finally, it is an object of this invention to provide microporous elastomeric structures and methods of making such structures in an efficient, rapid manner, and which can be formed into specific configurations or profiles by various methods.

SUMMARY OF THE INVENTION

The present invention provides a method of producing cellular, reticulated elastomeric structures having interconnected networks of cavities which are useable in retaining and self-metering liquids. The method of producing such microporous elastomeric structures comprises forming a homogeneous mixture comprising at least one polymeric resin, combined with void former and a polyfunctional compound.

The polymeric material may be selected from a wide variety of compounds and such material is preferably pulverized to a predetermined particle size which is dependent upon the desired structure of the resultant profile. An exemplary polymeric material is polyurethane. The ratio by weight between the polymeric material and the polyfunctional compound may also vary widely, but is preferably from 18:1 to 1:3. Exemplary polyfunctional compounds are polyhydroxy alcohols. The void former is preferably a salt which can be extracted via a solvent. The void former has a size distribution of 0.5 to 500 microns ($\geq$400-32 mesh size) dependent upon the porous network characteristics desired in the end product profile.

The void former, polymeric material and polyfunctional compound are preferably admixed at a temperature between 55 to 100 degrees Fahrenheit (F.). The mixture is shaped or formed by extrusion, injection molding or the like, which occurs at a relatively low temperature. The mixture is then cooled. The void former is then extracted to yield a microporous, open cellular structure with interconnected networks of cavities. The extraction is accomplished with a suitable solvent, for example, by leaching. Further, the method may include the step of drying the leached polymeric matrix. Finally, the dried polymeric matrix may be saturated with a liquid.

The invention further provides compositions for use in preparing cellular, reticulated elastomeric structures.

These and other benefits of this invention will become clear from the following description by reference to the drawings.

DETAILED DESCRIPTION OF THE INVENTION

Figure 1:
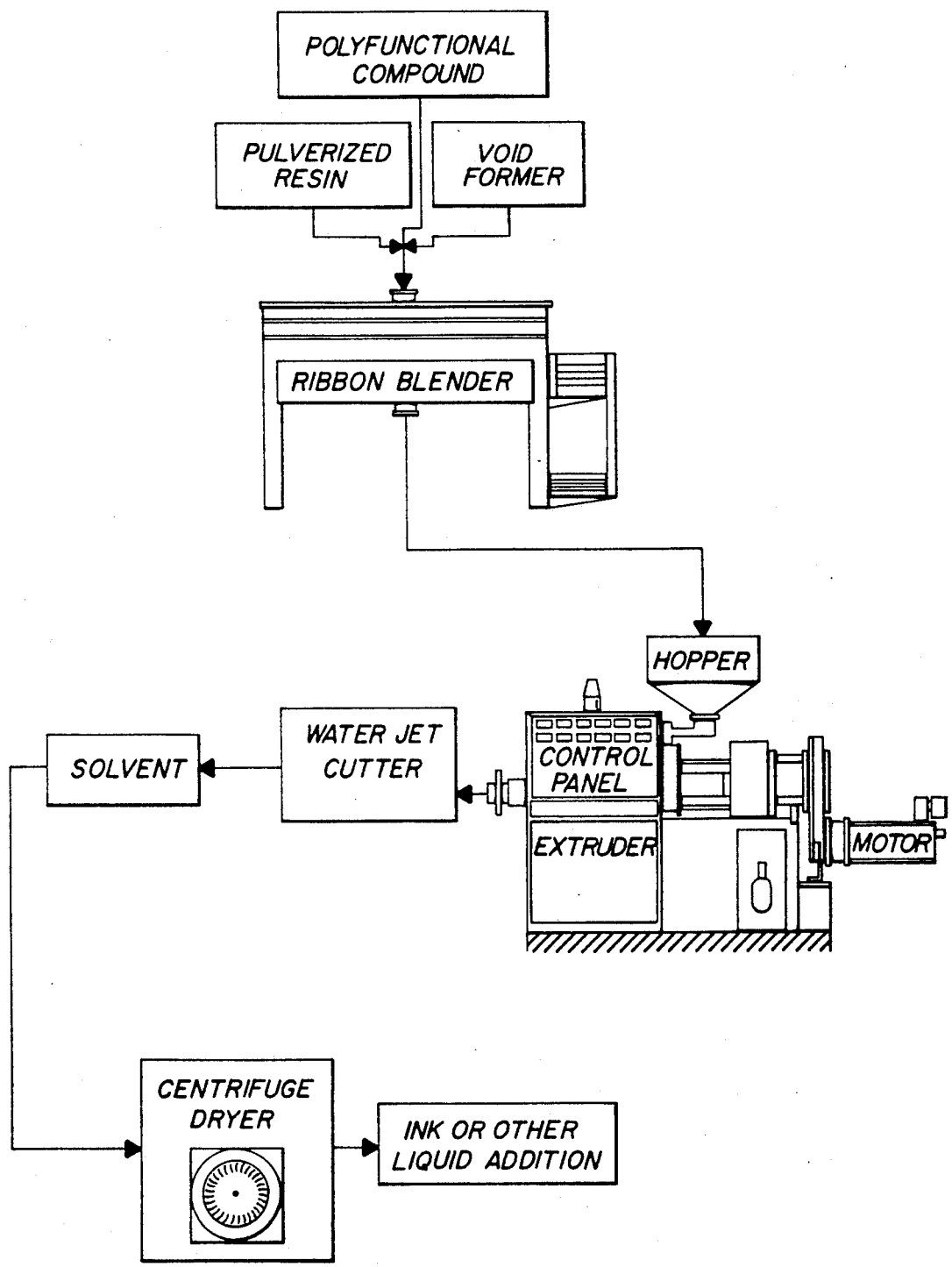
FIG. 1 is a flow diagram of the basic extrusion process of the invention, and showing apparatus for implementing the process.

The present invention relates to a method of producing microcellular reticulated elastomeric structures from polymeric materials, and to compositions useful therein. The basic method of producing such structures comprises forming a homogeneous mixture of a polymeric resin and a void former, and, importantly, adding a polyfunctional compound to the mixture. The ratio of polymeric resin to polyfunctional compound in the mixture is, however, highly variable. The mixture is shaped into a desired configuration, profile or structure by extrusion, injection molding or the like at a relatively low temperature. The void former is then extracted with a suitable solvent and the profile may be dried. Thereafter, the profile may be saturated with a liquid.

It will be appreciated that the method of this invention is not limited to the specific ingredients mentioned in the discussion and examples which follow. Provided the general working relationships mentioned herein are substantially fulfilled, a wide variety of polymeric resins, polyfunctional compounds and void formers can be used.

In the preferred embodiment, the polymer is a polyurethane. However, the polymer may comprise any one or a combination of the following materials: polyurethanes, plasticised polyvinyl chloride, a copolymer of vinyl chloride and vinylidene chloride, or vinylacetate, a butadiene-styrene copolymer, a polyester, a polyamide, for example nylon, a polyesteramide, a polyvinyl formal, polyvinyl alcohol, a polyacrylate or polystyrene.

Preferred exemplary polyurethanes useable as the polymer resin constituent are a proprietary polyurethane derived from a polyester, which is supplied by the B.F. Goodrich Company under the name ESTANE, or a proprietary thermoplastic polyurethane material supplied by Morton Intl. under the name MORTHANE. Polyurethanes such as these have a molecular weight in the range 20,000-400,000. Although the above discussed polyurethanes are preferred, the term polyurethane is to be understood in its broadest sense and includes any material derived from the reaction, or a reaction product of a reaction, between an isocyanate such as di-isocyanate and a molecule, which will be called the polyurethane precursor, containing at least two groups, such as hydroxyl, amid, or amine groups, which contain hydrogen atoms capable of reaction with an isocyanate group. The polyurethane precursor should generally be elastomeric, for example a polyester derivative or a polyether diol, or a polyester amide.

The precursor may be reacted with an excess of di-isocyanate to produce a polyurethane having a comparatively low molecular weight, for example on the order of 10,000, which will be called a polyurethane prepolymer, and which has isocyanate end groups. The prepolymer may then be chain-extended by reaction with a chain extending agent, for example a low molecular weight glycol, to produce a polyurethane containing urethane linkages (—N—H—CO—O—), or a low molecular weight diamine to produce a polyurea polyurethane containing urea linkages (—NH—CO—NH—).

Finally, these chain extended prepolymers may be cured. The curing process is believed to involve crosslinking and chain branching reactions between the unreacted isocyanate end groups and the active hydrogen containing groups in the polyurethane prepolymer chain. The degree of cross-linking and chain branching may be controlled by varying the ratio of isocyanate groups to total active hydrogen containing groups, and/or by the addition to the polymer during the curing stage of a molecule containing three groups containing active hydrogen, for example, a triol.

An increase in the degree of crosslinking modifies the plastic properties of the polyurethane producing a tendency for it to be thermosetting rather than thermoplastic. Conversely, a decrease in the degree of crosslinking produces a thermoplastic material. Such material is particularly useful, for example, in the production of porous structures for ink rollers. Thus, the polyurethane precursor, the di-isocyanate, and the chain extending agent are chosen to minimize further crosslinking or chain branching reactions which could occur during the curing stage of the polyurethane. For such uses, the polyurethane is preferably a thermoplastic elastomer having a predominantly linear structure with a low degree of cross linking.

The polymer resin is pulverized so that it is not greater than 20 mesh size prior to mixing with the remaining components. Preferably, the polymeric resin is pulverized between 20-300 mesh size (841-44 microns). The specific size of the resin pellets utilized is dependent upon the desired porous characteristics of the profile and, therefore, the application of the profile. It has been found that larger granules tend to yield a relatively rough porous network, while smaller granules tend to yield a finer porous network in the end product profile.

The invention is not dependent upon any particular theory, but it is believed that the presence of the polyfunctional agent dispersed throughout the composite, has a catalytic effect which results in a substantial reduction in the quantity of heat needed to melt the polymeric resin. This reduction in the melt point of the polymeric resin improves the processability of the composite. The processability of polymers is commonly defined in terms of their "melt index", measured in accordance with ASTM-D1238. The melt index is a measure of the flow rate, by extrusion plastometer, of material and is given as grams of material per unit time. The property measured by such a test is basically melt viscosity. The magnitude of reduction in the amount of heat required to melt the polymeric resin in the presence of an appropriate polyfunctional agent is dependent on the initial melt point of the polymer. For example, a 400,000 molecular weight polyurethane resin has a melt point of 380° F. It has been found that in the presence of polyglycol, the melt point of the polyurethane can be lowered to approximately 230° F.

The ratio of the polyfunctional compound to polymer in the mixture is variable. Ratios ranging from 18:1 to 1:3 by weight of polymer to polyfunctional agent are preferred. However, ratios as high as 80:1 have been shown to be effective at lowering the melt point of the composite. In the most preferred embodiment of the present invention, the polyfunctional compound is provided in an amount of 5-33% by weight and the polymeric resin is provided in an amount of 15-37% by weight. Generally, it has been found that a lower ratio of polyfunctional agent to polymer results in a higher melt point composite, whereas a higher ratio of polyfunctional agent to polymer results in a lower melt point composite.

Polyfunctional materials suitable for use in the present invention are diverse and include materials which are relatively sparingly soluble in conventional solvents as well as those which are soluble. Water-soluble polyhydroxy alcohols are especially suitable because of their ease of extraction. Illustrative of the water-soluble polyfunctional compounds are Glycols such as Polyethylene Glycol (100, 400, 1000 and 10,000) R—CH(OH)—CH(OH)—R; Polypropylene Glycol (50, 200, 3000 and 8000) H(OCH2CH)$_n$OH; and Ethylene Glycol H°OCH(CH3)CH2)$_n$OH. Further illustrative of these compounds are 1,3-Propanediol, Gylcerol, 1,2-Butanediol, 2,3-Dimethyl-2,3- Butanediol, Triethylene Glycol, Diethylene Glycol, Triethanolamine and Diethanolamine. The wide range of polyfunctional compounds, including polyhydroxy alcohols and related compounds, used in the basic process make it possible to select various properties for matrix formation for a wide variety of uses due to the ability to select components which are compatible with resins, void formers and filler liquids.

In addition to functioning as a means of lowering the melt point of the polymeric resin and thus improving the processability of the composite, the polyfunctional compound also can function as a void former and, thus, aiding in reticulating the porous structure. It is within the purview of the invention that a suitable polymer can be combined with a polyfunctional compound alone, without an additional void former. The polyfunctional compound can subsequently be extracted to form the microporous matrix.

Another important aspect of this invention is that the polyfunctional compound has limited compatibility with the polymer and, thus, it need not become part of the integral structure of the matrix. That is, unless the point in which the induced melting point of the polymeric resin is reached by the presence of the polyfunctional agent, the polymer and polyfunctional agent show no sign of miscibility, thus, the polyfunctional agent does not become an integral part of the matrix itself. Once the induced melt point is reached, both polymer and polyfunctional agent become miscible. Thus, cooling the heated composite below it's new melt point returns both materials to their incompatible state.

A wide range of void-formers is also useable consistent with the teachings of this invention. Importantly, the void former must be chemically inert so that it does not react with the polymeric composition. Preferably, the void former is selected from the group of water soluble salts consisting of sodium chloride, sodium nitrate, and magnesium sulfate and its hydrate forms. As discussed above, the polyfunctional compound itself may function as a void former. Such chemicals are commonly available, easy to use, and are produced in a wide range of sizes. Size distributions of 0.5 to 500 microns ($\cong$400-32 mesh size) are preferable, but size range may further vary depending upon the cellular characteristics necessary to fit the application of the profile. For instance, ranges of 2 to 60 and 60 to 500 microns have been used in formulating profiles for use in ink rollers. Ratios ranging from 2.0:1 to 10:1 by weight of void former to polymer are preferred, however, the ratio of the void former to the polymer can vary depending upon the specific application. In the most preferred embodiment, the void former is employed in an amount of 33 to 80 percent by weight.

Figure 3A:
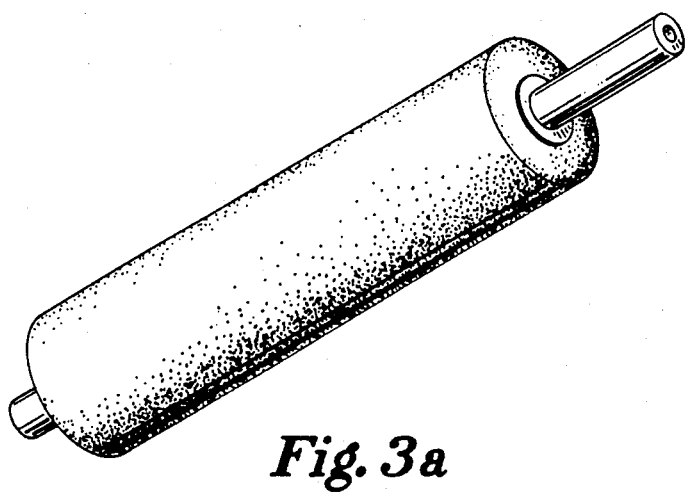
FIGS. 3A-C show cross-sectional views of a profile according to the present invention, and showing the reticulated porous structure thereof.
Figure 3B:
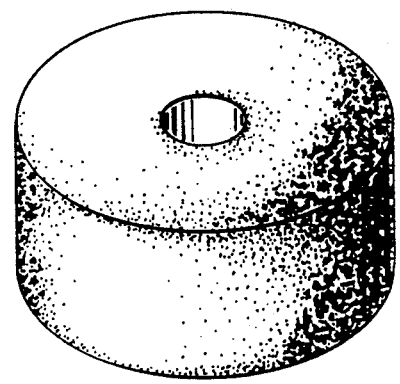
Figure 3C:
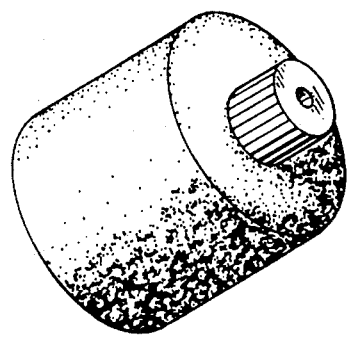
Figure 3D:
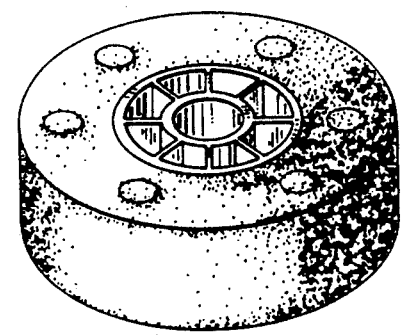

FIGS. 3A-C show the open cavity network of the resultant elastomeric materials formed by a matrix of polymeric filaments, having therebetween a series of continuously connected channels, and into which a suitable liquid can be stored. As shown, the cavities are considerably larger than the connecting channels. The smaller size of channels performs a self-metering function inasmuch as only a limited volume of liquid can exit therethrough when the pad is placed under pressure. As also shown in the drawings, the cavities and channels are reticular in configuration. FIGS. 3A, C and D are photographic reproductions of actual profiles in order of increasing magnification. FIG. 3B is a drawing of the expected structure of the polymeric filaments.

A wide variety of liquid fillers can be incorporated into the channels and contained in the reservoirs. By way of example, commercially prepared inks from Ink Specialities, Cal Ink, and Sun Oil, have been employed as have commercially prepared oils from Dow Corning, Shell and Texaco.

Figure 4A:
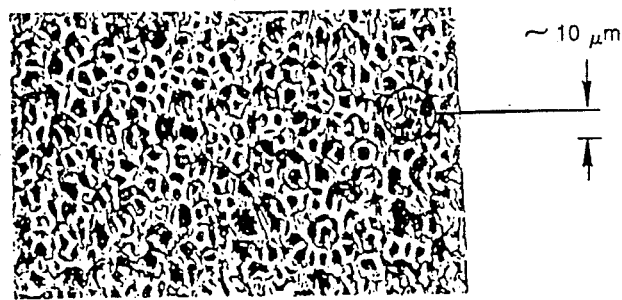
FIGS. 4A-C show exemplary profiles or structures produced according to the process.
Figure 4B:
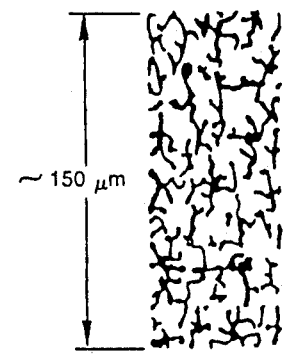
Figure 4C:
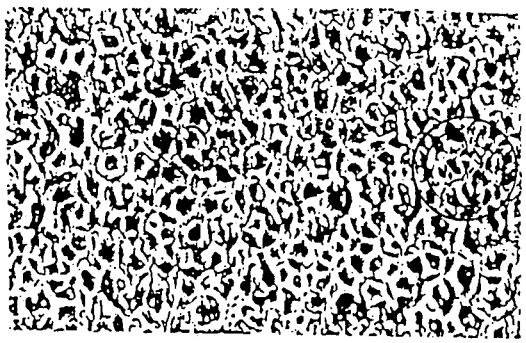
Figure 4D:

The combination of the above reactants are mixed to provide a homogeneous mixture. Mixing may be accomplished by a variety of known means. Mixing preferably occurs at approximately room temperature, or between 55° and 100° F. The homogeneous mixture is then formed into specific profiles or structures as shown, for example, in FIGS. 4A-C, depending upon use, via extrusion, injection molding, calendaring, pressing or other means known in the art. Importantly, due to the presence of the polyfunctional compound in the mixture, forming and processing occurs at a relatively low temperature, which is a function of the new melt point of the polymer composites. Reductions of approximately 50–75% in melting temperature of the polymeric resin have been demonstrated. The void former is then extracted from the cooled (preferably between 33°–120° F.), set profile, preferably via a solvent. The choice of solvent or solvent system used is dependent upon the void former used. The profile may then be dried prior to saturation with a liquid such as an ink, dye or lubricant.

A further important aspect of this invention is that it provides the ability to use injection molding processes for polymeric compositions which has not been typically applicable with conventional softened polymers. This process enables the injection of a measured quantity of a softened composite into an injection molding die. The process is dependent on the degree of softening or melting of the thermoplastic elastomeric resins as discussed in the basic process.

To more fully illustrate the present invention, the following non-limiting examples are presented. In the examples, the initial reactants were combined and mixed in a Ribbon Blender. Drying of the solvent leached profiles was accomplished via a centrifuge dryer.

EXAMPLE 1

Microporous elastomeric compositions within the scope of the present invention were formed by employing a mixture of components or reactants as follows. A polyurethane ester resin having a molecular weight of 300,000 has a standard melt point of 400° to 425° F. In the presence of a 3000 molecular weight polyethylene glycol, the resin melts at 123° F.

Thirty-seven percent by weight of a polymeric resin mixture of polyurethane ester and polyurethane carbonate are combined with 13% by weight polyethylene glycol and 50% by weight sodium carbonate (25 mesh particle size) at approximately 42° F. until a homogeneous mixture was formed. The mixture is then extruded into a predetermined profile. The extruder barrel and die temperatures and die pressure are all maintained as known in the art and further relative to the new melt index of the polymeric resin. The extruded profile is then cooled to approximately 55° F. and subsequently leached in HCL·H$_2$O for approximately 5 hours.

FIG. 1 shows a schematic diagram of an apparatus for implementing the process described in this example.

EXAMPLE 2

Fifteen percent by weight of a 200,000 molecular weight thermoplastic polyester amide having a melt point of 380° F. is combined with 5 percent by weight triethanolamine (molecular weight 10,000) and 80 percent by weight 200 mesh sodium chloride. The mixture is then mixed at 65° F. until homogeneous. The composite is fed to an extruder at ambient temperature and extruded as a profile. The through-put temperature is 100° to 190° F. and the exit temperature is 80° to 140° F. The initial 380° F. melt point of the polymeric resin was found to be reduced to approximately 88° F.

The exiting profile is then cooled through a water bath for approximately 5 hours at approximately 58° F. This temperature is approximately 30° F. below the newly generated melt point of the polyester amide/triethanolamine composite.

An apparatus for implementing the process described in this example is shown in FIG. 1.

EXAMPLE 3

To 100 grams polyurethane ester (molecular weight 300,000) having a melt index of 410° F., is added 100 grams of a polyethylene glycol (molecular weight 2000). To this mixture is added 100 grams of sodium chloride. These components are mixed at a temperature below 70° F. until a homogeneous blend is obtained. The composite is fed to an injection molding machine set at a shot temperature of 130° to 150° F. A load force of 10 tons is used to shoot the composite into a 1 oz. cavity. The new polymeric melt index was found to be approximately 200° F.

The molded shape is then cooled from 45° to 65° F. and then placed in a fresh water bath for approximately 16 hours to extract the salt and polyglycol, thus leaving a porous open cellular polyurethane profile.

Figure 2:
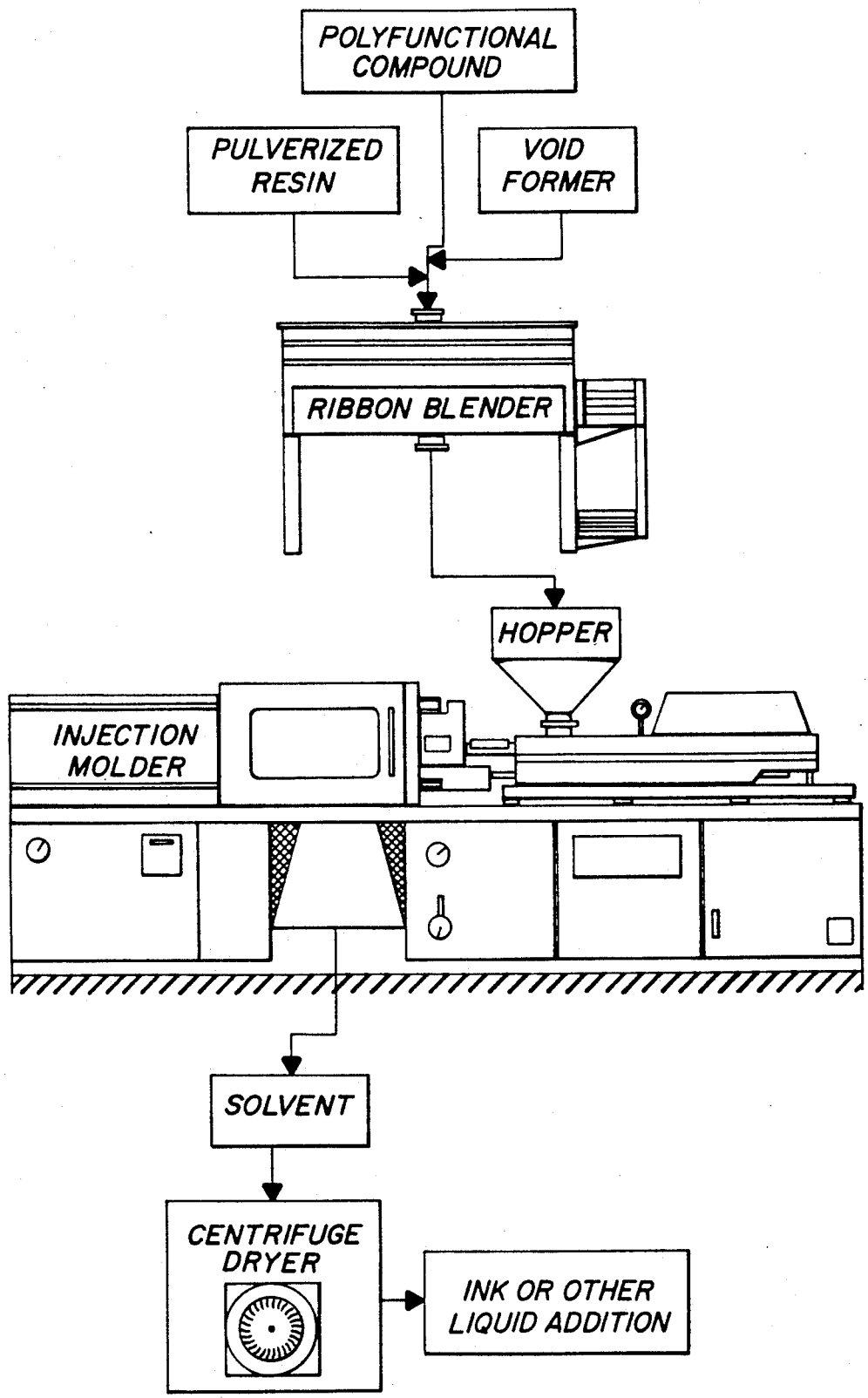
FIG. 2 is a flow diagram of the basic injection molding process of the invention, and showing apparatus for implementing the process.

FIG. 2 is a schematic diagram showing an apparatus for implementing the process described in this example.

EXAMPLE 4

This example is illustrative of preparing a self-metering retentive ink roller employing pulverized polyurethane resin, polyethylene glycol and sodium chloride as the void former. With reference to the apparatus shown in FIG. 1, to 8 parts by weight of a pulverized polyurethane (between 100,000 and 400,000 molecular weight) is added 0.2 parts by weight of a polyethylene glycol. To this mixture is added 1.1 parts by weight 60 mesh sodium chloride in a ribbon blender for 5 to 10 minutes, at a temperature below 100° F. The composite is fed to a extruder. The extruder barrel temperature is maintained at 150°-250° F. and the extruder die is controlled at 130° to 160° F. The die pressure is maintained at 4000 to 6000 psi. The initial melt point of the polymeric resin, 250° F., was found to be reduced to approximately 65° F.

The extrudate is periodically cut to size as its exits the die opening, and the severed extrudate units are guided to a cooling and leaching water tank where they are leached at a water temperature of 70° to 120° F. for a period of approximately 48 hours. The residual salt is rinsed from the individual with tap water at room temperatures and the water is extracted by centrifuge. The units are then dried and filled with pigmented ink.

In summary, the microporous elastomeric structures are made by the process of, admixing a void former, typically a non-reactive water soluble salt of a size range between 0.5 and 500 microns, with a pulverized polymeric material of a size range between 20 and 300 mesh. Then dispersed therein, is a polyfunctional compound, typically a freely water soluble Polyhydroxy Alcohol. Preferred mixtures are a weight ratio of 18:1 to 1:3 polymer to Polyhydroxy Alcohol, and 2:1 to 10:1 void former to polymer. The void former, polymer and Polyfunctional Alcohol are dispersed together at a temperature between 55 to 100 degrees F. to form a homogeneous composite. The material is then formed into desirable shapes as known in the art utilizing relatively low processing temperatures which are a function of the new melt index of the composite, and without additional plasticizers. Subsequently, the salt is leached from the preshaped polymeric matrix with a suitable solvent, and the leached polymeric matrix is dried. The polymeric matrix thus formed may then be filled with liquids using conventional methods.

As many changes are possible to the embodiments of this invention utilizing the teachings thereof, the descriptions above, and the accompanying drawings should be interpreted in the illustrative and not the limited sense.

That which is claimed is:

1. A method of making a fluid dispensing microporous material, comprising the steps of:
    a) preparing a mixture of a void former, a polymeric material having a predetermined melt point and a polyhydroxy alcohol compound, said polymeric material being selected from the group consisting of a polyurethane, a plasticised polyvinyl chloride, a copolymer of vinyl chloride and vinylidene chloride or vinyl acetate, a butadiene-styrene copolymer, a polyester, a polyamide, a polyesteramide, a polyvinyl formal, a polyvinyl alcohol, a polyacrylate, and a polystyrene, and said polyhydroxy alcohol compound being selected from the group consisting of polyethylene glycol, polypropylene glycol, ethylene glycol, 1,3-propanediol, glycerol, 1,2-butanediol, triethylene glycol, diethylene glycol, triethanolamine, and diethanolamine;
    b) said polymeric material being provided in a ratio by weight of 18:1 to 1:3 with respect to said polyhydroxy alcohol compound;
    c) shaping said mixture into a predetermined profile structure via molding at a temperature below said melt point of said polymeric material;
    d) cooling said profile structure to a predetermined temperature below said molding temperature; and
    e) extracting the void former from said profile structure with a solvent.

2. The method of making a microporous material of claim 1, wherein said polymeric material is pulverized so that it is not greater than 20 mesh particle size.

3. The method of making a microporous material of claim 2, wherein said mesh particle size is between 20 and 300.

4. The method of making a microporous material of claim 1, wherein said polymeric material is provided in an amount of 15-37 percent by weight, wherein said polyfunctional compound is provided in a amount of 5-33 percent by weight, and wherein said void former is provided in an amount of 33-80 percent by weight.

5. The method of making a microporous material of claim 4, wherein said ratio by weight of polymeric material to polyfunctional compound is varied depending upon the melt point of the polymeric material.

6. The method of making a microporous material of claim 1, wherein said ratio by weight of said void former to said polymeric material is from 2.0:1 to 10.0:1.

7. The method of making a microporous material of claim 1, wherein said void former is a water soluble salt selected from the group consisting of sodium chloride, sodium nitrate and magnesium sulfate.

8. The method of making a microporous material of claim 1, wherein said void former has a size distribution of 0.5 to 500 microns.

9. The method of making a microporous material of claim 1, wherein said void former, said polymeric material and said polyhydroxy alcohol compound are admixed at a temperature between 55 to 100 degrees Fahrenheit.

10. The method of making a microporous material of claim 9, wherein said profile structure is cooled to approximately 33–120 degrees Fahrenheit.

11. The method of making a microporous material of claim 1, wherein said mixture is shaped via low temperature extrusion.

12. The method of making a microporous material of claim 1, wherein said mixture is shaped via low temperature injection molding.

13. The method of making a microporous material of claim 1, further comprising the step of drying the extracted profile structure and the step of saturating the dried, profile structure with a liquid.

14. A method of making a fluid dispensing reticulated microporous elastomeric material, comprising the steps of:
  a) preparing a mixture by admixing a void former, a pulverized polymeric material having a predetermined melt point and a polyhydroxy alcohol compound at a temperature of 55 to 100 degrees Fahrenheit, said polymeric material being selected from the group consisting of a polyurethane, a plasticised polyvinyl chloride, a copolymer of vinyl chloride and vinylidene chloride or vinyl acetate, a butadiene-styrene copolymer, a polyester, a polyamide, a polyesteramide, a polyvinyl formal, a polyvinyl alcohol, a polyacrylate, and a polystyrene, and said polyhydroxy alcohol compound being selected from the group consisting of polyethylene glycol, polypropylene glycol, ethylene glycol, 1,3-propanediol, glycerol, 1,2-butanediol, triethylene glycol, diethylene glycol, triethanolamine, and diethanolamine;
  b) said polymeric material being provided in a ratio by weight of 18:1 to 1:3 with respect to said polyhydroxy alcohol compound;
  c) shaping said mixture into a predetermined structure via molding, whereby said mixture melts at an induced melt point below said melt point of said polymeric material;
  d) cooling said structure to a predetermined temperature below said induced melt point; and
  e) extracting the void former from said structure with a solvent.

15. A method of making a reticulated microporous elastomeric material having interconnected networks of cavities and for use in retaining and self-metering liquids, comprising the steps of:
  a) preparing a mixture by admixing approximately 33–80 percent by weight of a void former, approximately 15–37 percent by weight of a pulverized polymeric material selected from the group consisting of a polyurethane, a plasticised polyvinyl chloride, a copolymer of vinyl chloride and vinylidene chloride or vinyl acetate, a butadiene-styrene copolymer, a polyester, a polyamide, a polyesteramide, a polyvinyl formal, a polyvinyl alcohol, a polyacrylate, and a polystyrene, said polymeric material having a known melt point, and approximately 5–33 percent by weight of a polyhydroxy alcohol selected from the group consisting of polyethylene glycol, polypropylene glycol, ethylene glycol, 1, 3-Propanediol, glycerol, 1,2-butanediol, triethylene glycol, diethylene glycol, triethanolamine, and diethanolamine, at between 55 to 100 degrees Fahrenheit;
  b) said void former having a size distribution of 0.5 to 500 microns;
  c) said polymeric material being pulverized so that it is not less than 20 mesh particle size;
  d) molding the mixture into a predetermined structure at a temperature below said known melt point of said polymeric material, whereby said mixture melts at an induced melt point which is below said melt point of said polymeric material;
  e) cooling said profile structure to a predetermined temperature below said induced melt point; and
  f) extracting the void former from said structure with a solvent.

* * * * *